US009790439B2

(12) United States Patent
Nousiainen et al.

(10) Patent No.: US 9,790,439 B2
(45) Date of Patent: Oct. 17, 2017

(54) PROCESS AND APPARATUS FOR PRODUCING FUEL FROM A BIOLOGICAL ORIGIN THROUGH A SINGLE HYDROPROCESSING STEP IN THE PRESENCE OF A NIW CATALYST

(75) Inventors: Jaakko Nousiainen, Helsinki (FI); Pekka Knuuttila, Porvoo (FI); Arto Rissanen, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 535 days.

(21) Appl. No.: 13/699,328

(22) PCT Filed: May 23, 2011

(86) PCT No.: PCT/FI2011/050461
§ 371 (c)(1),
(2), (4) Date: Nov. 21, 2012

(87) PCT Pub. No.: WO2011/148045
PCT Pub. Date: Dec. 1, 2011

(65) Prior Publication Data
US 2013/0067801 A1    Mar. 21, 2013

(30) Foreign Application Priority Data
May 25, 2010    (FI) ................................. 20105585

(51) Int. Cl.
*C10L 1/02* (2006.01)
*B01J 8/00* (2006.01)
(Continued)

(52) U.S. Cl.
CPC ............ *C10G 45/60* (2013.01); *C10G 3/46* (2013.01); *C10G 3/48* (2013.01); *C10G 3/49* (2013.01);
(Continued)

(58) Field of Classification Search
USPC .................................................. 44/306, 639
See application file for complete search history.

(56) References Cited

U.S. PATENT DOCUMENTS

| 5,705,722 A | 1/1998 | Monnier et al. |
| 2007/0170091 A1 | 7/2007 | Monnier et al. |

(Continued)

FOREIGN PATENT DOCUMENTS

| EP | 1 034 841 A2 | 9/2000 |
| EP | 1741768 A1 | 1/2007 |

(Continued)

OTHER PUBLICATIONS

Finnish Search Report issued in FI20105585, dated Feb. 10, 2011.
(Continued)

*Primary Examiner* — Vishal Vasisth
*Assistant Examiner* — Chantel Graham
(74) *Attorney, Agent, or Firm* — Cantor Colburn LLP (57) ABSTRACT

The present invention relates to a process for producing mixture of fuel components, which process comprises providing a feed of biological origin; subjecting said feed of biological origin and a hydrogen gas feed to a single step of hydroprocessing in the presence of a catalyst system comprising dewaxing catalyst to form a mixture of fuel components. The present invention relates also to an apparatus for producing a mixture of fuel components from a feed of biological origin. The invention relates also to the use of the fuel components.

13 Claims, 3 Drawing Sheets

(51) Int. Cl.
*C10G 45/60* (2006.01)
*C10L 1/04* (2006.01)
*C10L 1/06* (2006.01)
*C10L 1/08* (2006.01)
*C10G 3/00* (2006.01)

(52) U.S. Cl.
CPC ............... *C10G 3/50* (2013.01); *C10L 1/04* (2013.01); *C10L 1/06* (2013.01); *C10L 1/08* (2013.01); *C10G 2300/1014* (2013.01); *C10G 2300/1018* (2013.01); *C10G 2300/1022* (2013.01); *C10G 2300/202* (2013.01); *C10G 2300/4018* (2013.01); *C10G 2300/4081* (2013.01); *C10G 2300/802* (2013.01); *C10G 2400/02* (2013.01); *C10G 2400/04* (2013.01); *C10G 2400/08* (2013.01); *Y02E 50/13* (2013.01); *Y02P 30/20* (2015.11); *Y02T 50/678* (2013.01)

(56) References Cited

U.S. PATENT DOCUMENTS

| | | |
|---|---|---|
| 2008/0161615 A1 | 7/2008 | Chapus et al. |
| 2008/0308457 A1 | 12/2008 | Dindi et al. |
| 2009/0077866 A1 | 3/2009 | Kalnes et al. |
| 2009/0253947 A1* | 10/2009 | Brandvold et al. ............ 585/14 |
| 2009/0288988 A1 | 11/2009 | Mayeur et al. |
| 2009/0300970 A1 | 12/2009 | Perego et al. |
| 2009/0300971 A1 | 12/2009 | Abhari et al. |
| 2010/0038284 A1 | 2/2010 | Vergel |
| 2010/0043279 A1 | 2/2010 | Anhari et al. |
| 2010/0076236 A1* | 3/2010 | Van Heuzen et al. ........ 585/313 |
| 2010/0146847 A1* | 6/2010 | Stevens et al. ................ 44/443 |
| 2011/0047862 A1 | 3/2011 | Mayeur et al. |
| 2011/0119994 A1* | 5/2011 | Hogendoorn et al. .......... 44/307 |
| 2011/0240521 A1* | 10/2011 | Shih .............................. 208/89 |

FOREIGN PATENT DOCUMENTS

| | | |
|---|---|---|
| EP | 1956070 A1 | 8/2008 |
| EP | 2325281 A1 * | 5/2011 |
| FI | 100248 B | 10/1997 |
| RU | 2146171 C1 | 3/2000 |
| RU | 2 245 191 C2 | 1/2005 |
| WO | WO 95/31280 A1 | 11/1995 |
| WO | WO 2006/100584 A2 | 9/2006 |
| WO | WO 2008/087279 A2 | 7/2008 |
| WO | WO 2008/101945 A1 | 8/2008 |
| WO | WO 2008/152199 A1 | 12/2008 |
| WO | 2009151690 A2 | 12/2009 |
| WO | WO 2010/046746 A2 | 4/2010 |
| WO | 2011095688 A2 | 8/2011 |

OTHER PUBLICATIONS

International Preliminary Report on Patentability in PCT/FI2011/050461, completed on Aug. 14, 2012.
International Search Report issued in PCT/FI2011/050461, mailed on Oct. 7, 2011.
Russia Office Action for Appl. No. 2012156250/04(088964) dated Feb. 16, 2015 (w/ English translation).
Gagnon, J. et al. "Catalytic Hydrotreatment of Vacuum Pyrolysis Oils from Wood", Ind. Eng. Chem. Res. (1988), vol. 27, No. 10, pp. 1783-1788.
Garcia-Perez, M. et al. "Vacuum pyrolysis of softwood and hardwood biomass Comparison between product tields and bio-oil properties", Journal of Analytical and Applied Pyrolysis, (2007), vol. 78, pp. 104-116.
Finland Application No. FI20105094; Filing Date: Feb. 2, 2010; 30 Pages.
Knuuttila et al.—FI20105094—printout from FI PTO database; 1 Page.
Kubicka, D. et al. "Deoxygenation of vegetable oils over sulfided Ni, Mo and NiMo catalysts", Applied Catalysis A: General, (2010), vol. 372, pp. 199-208.
Mikulec, J. et al. "Production of Diesel Fuels From Waste Triacyglycerols by Hydrodeoxygenation", 44th International Petroleum Conference, Bratislava, Slovak Republic, Sep. 21-22, 2009, 15 Pages.
Russian Decision on Grant for Russian Application No. 2012156250/04, mailed Jun. 8, 2015, with an English translation.

* cited by examiner

PROCESS AND APPARATUS FOR PRODUCING FUEL FROM A BIOLOGICAL ORIGIN THROUGH A SINGLE HYDROPROCESSING STEP IN THE PRESENCE OF A NIW CATALYST

FIELD OF THE INVENTION

The present invention relates to a process for producing mixture of fuel components, and more particularly to a process for producing fuel components from a feed of biological origin in a single-step hydroprocessing in the presence of a catalyst capable of hydrodeoxygenating, isomerising and cracking, such as dewaxing catalyst. The present invention further relates to an apparatus for producing fuel components as well as to a use of the fuel components as a fuel or as an additive in a fuel composition.

BACKGROUND OF THE INVENTION

There is an increasing interest on the use of hydrocarbon components of biological origin from renewable sources in fuels to replace the fossil starting materials. There are various literature references relating to production of fuel compositions from biological starting materials. For example Finnish Patent 100248 describes a production of middle runnings (middle distillate) of vegetable oil. In the first stage of the production method the fatty acids or triglycerides of vegetable oil are hydrogenated to n-paraffins in a HDO/HDS step and in the second stage said n-paraffins are catalytically converted into branched-chain paraffins (isomerisation). However, this process has the drawback that it needs a purification step between the two process steps since the isomerisation catalyst is poisoned by the sulphur compounds that are formed in the first stage. Additionally, yield of the desired product decreases, as the number of process steps increases. For example, when two process steps each operating with an 80% yield rate are arranged in series, the final yield rate after both process steps will be only 64%. Further, the two step process adds investment costs, process complexity, intermediate steps and operating costs.

BRIEF DESCRIPTION OF THE INVENTION

An object of the present invention is to provide a process and an apparatus for implementing the process so as to alleviate the above disadvantages. The objects of the invention are achieved by a method and an arrangement, which are characterized by what is stated in the independent claims. The preferred embodiments of the invention are disclosed in the dependent claims.

It has now been found that a feed of biological origin can be processed in a single step of hydroprocessing in the presence of hydrogen gas and a catalyst system comprising dewaxing catalyst to form a mixture of fuel components.

It has surprisingly been found out that dewaxing catalysts, which tolerate sulphur well, can be used for hydroprocessing feeds originating from biological materials, such as tall oil feed, to produce fuel components, as effectively as or even better than actual sulphur removing catalysts, such as NiMo or CoMo catalysts. Dewaxing catalysts have been previously used for isomerising. It has now been surprisingly found out that HDO/HDS catalysts can be replaced with a dewaxing catalyst in hydroprocessing feeds originating from biological material. The process of the present invention uses a dewaxing catalyst for hydrogenating the double bonds of the feed originating from biological material and for removing by hydrogenation heteroatoms of the feed molecules, especially oxygen. At the same time sulphur compounds are reduced to hydrogen sulphide. The dewaxing catalyst is also capable of isomerizing straight carbon backbones of n-paraffins (linear alkanes) to branched backbones of isoparaffins (branched alkanes) and cracking. The isomerizing improves the cold flow properties of the fuel.

The components obtained in the process of the invention can be used as fuel components as such or as fuel additives in fuel compositions. The fuel components obtained from the process have a carbon number typical for diesel fuel components, varying from C10 to C28. Light fractions, which are <C10 can be used as gasoline and/or naphtha.

In a specific embodiment of the invention, crude or prepurified tall oil is used as a starting material.

It is an advantage of the process of the present invention that there is no need for any pretreatment procedure in order to remove sulphur from the feed of biological origin prior to its further processing. The invention thus provides a simple one-step, efficient and economical process for the treatment of the hydrocarbon feeds of biological origin to provide a product that is usable for fuel applications. An advantage of the present invention is that the catalyst used does not poison.

The invention is based on the idea of producing a mixture of fuel components with a process wherein a feed of biological origin is provided and said feed of biological origin and a hydrogen gas feed are subjected to a single step of hydroprocessing in the presence of a catalyst system comprising dewaxing catalyst.

BRIEF DESCRIPTION OF THE DRAWINGS

In the following the invention will be described in greater detail by means of preferred embodiments with reference to the attached accompanying drawings, in which.

Process units and/or inlets/outlets which are shown in dotted line in the Figures are optional.

DETAILED DESCRIPTION OF THE INVENTION

The present invention relates to a process for producing a mixture of fuel components, which process comprises
providing a feed of biological origin;
subjecting said feed of biological origin and a hydrogen gas feed to a single step of hydroprocessing in the presence of a catalyst system comprising dewaxing catalyst to form a mixture of fuel components.

The feed of biological origin can be any kind of biological material suitable for producing a mixture of fuel components. According to one embodiment of the present invention the feed of biological origin is selected from the group consisting of i) any kind of fats, any kind of waxes, plant fats, plant oils, plant waxes; animal fats, animal oils, animal waxes, fish fats, fish oils, fish waxes, and ii) fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis, and iii) esters obtained from plant fats, plant oils, plant waxes; animal fats, animal oils, animal waxes; fish fats, fish oils, fish waxes, and mixtures thereof by transesterification, and iv) metal salts of fatty acids obtained from plant fats, plant oils, plant waxes; animal fats, animal oils, animal waxes; fish fats, fish oils, fish waxes, and mixtures thereof by saponification, and v) anhydrides of fatty acids from plant fats, plant oils, plant waxes; animal fats, animal oils, animal waxes; fish fats, fish oils, fish waxes, and mixtures thereof, and vi) esters obtained by esterification of free fatty acids of plant, animal and fish origin with alcohols, and vii) fatty alcohols or aldehydes obtained as reduction products of fatty acids from plant fats, plant oils, plant waxes; animal fats, animal oils, animal waxes; fish fats, fish oils, fish waxes, and mixtures thereof, and viii) recycled food grade fats and oils, and fats, oils and waxes obtained by genetic engineering, ix) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds, and x) compounds derived from algae, xi) terpene-based compounds obtained from plants, terpene oils, distillation bottoms from terpene distillation and flavorants and/or fragrance industry, xii) resins, resin acids or sterols obtained from plants, bio-oil from hydropyrolyzed wood, Fischer-Tropsch wax and xiii) mixtures of said feeds of biological origin.

According to another embodiment of the present invention the feed of biological origin is selected form the group consisting of fish oils such as Baltic herring oil, salmon oil, herring oil, tuna oil, anchovy oil, sardine oil, and mackerel oil; plant oils such as rapeseed oil, colza oil, canola oil, tall oil, crude tall oil, sunflower seed oil, soybean oil, corn oil, hemp oil, linen seed oil, olive oil, cottonseed oil, mustard oil, palm oil, peanut oil, castor oil, Jatropha seed oil, Pongamia pinnata seed oil, palm kernel oil, and coconut oil; and animal fats such as lard, tallow, rendered lard and rendered tallow, and waste and recycled food grade fats and oils, as well as fats, waxes and oils produced by genetic engineering; animal waxes such as bee wax, Chinese wax (insect wax), shellac wax, and lanoline (wool wax); plant waxes such as carnauba palm wax, Ouricouri palm wax, jojoba seed oil, candelilla wax, esparto wax, Japan wax, rice bran oil, terpenes, terpineols and triglycerides or mixtures thereof. According to a preferred embodiment of the present invention the feed of biological origin is tall oil or crude tall oil.

Further, turpentine separated from crude tall oil which is retrieved from kraft pulping process is a suitable source of terpene-based compounds.

The feed of biological origin can be purified or unpurified before it is fed to the hydroprocessing step. The purification of the feed of biological origin can be done by standard methods employed usually in edible oil processing Also methods such as adsorption on a suitable material, ion exchange or acidic washing can be used to remove alkali metals and earth alkali metals (Na, K, Ca) in the feed. Also degumming, i.e. washing the feed with $H_3PO_4$, NaOH and soft water can be used to remove the metals in the feed. If the feed contains tall oil, depitching the crude tall oil can be used to remove unsaponifiables and ash in the tall oil. All these purification methods are well known in the art and is not discussed here in further detail.

The process of the present invention is carried out in a single step of hydroprocessing in the presence of a catalyst system comprising dewaxing catalyst. The dewaxing catalyst used is capable of hydrodeoxygenating, isomerising, ring opening and cracking, more specifically, the dewaxing catalyst hydrogenates the double bonds of the feed of biological origin fed to the hydroprocessing step. The dewaxing catalyst removes heteroatoms of the feed molecules, especially oxygen, by hydrating. The dewaxing catalyst (NiW) has a capability of hydrogenating the olefinic bonds of the compounds in the feed, opening at least one of the bicyclic rings, and cracking the side chains of hydrocarbon chains in a single step. In other words, hydrocarbons are hydrogenated, isomerized and/or cracked in a single step. The cracking/isomerizing are controlled by process variables, such as pressure and/or temperature, feed rates and by the properties of the catalyst, for example controlling its acidity. At the same time sulfur compounds are reduced to hydrogen sulphide.

The hydroprocessing step can be carried out in any kind of reactor, column, vessel, container, tube or pipe, which is suitable for hydroprocessing.

The dewaxing catalyst material according to the present invention is NiW on a support selected from $Al_2O_3$, zeolite, zeolite-$Al_2O_3$, and $Al_2O_3$—$SiO_2$. Preferably the dewaxing catalyst is NiW on an $Al_2O_3$ support. The catalyst material must be activated before it is effective and taken into use. The activation comprises several steps, of which one is treating the catalyst with activating sulphur compound, for example dimethyl disulphide. The activation of catalysts is common knowledge in the art and will thus not be discussed here in detail.

The dewaxing catalyst used in the hydroprocessing according to the present invention can be diluted with silicon carbide, aluminium oxide, glass beads, less active catalyst and/or inert material. The less active catalyst means that the catalyst is same as the dewaxing catalyst but it has smaller amount of active metals and/or active structure. The dewaxing catalyst used in the process according to the present invention can also be undiluted. The diluting of the catalyst helps in controlling the exothermic balance of the reaction.

The catalyst system of the present invention may further comprise a guard bed. The guard bed has the task of acting against harmful substances in the feed. The guard bed is typically activated gamma aluminium oxide or some commercially available purifying catalyst and the bed is placed in the hydroprocessing reactor itself and/or outside the reactor in a separate guard bed unit. It is also possible that the catalyst system comprises two or more guard bed units. These guard bed units can be operated sequentially, i.e. when the other guard bed is in use, the other is at the same time regenerated for further use. The purpose of the guard bed is to act as a purifying bed and also as a distributing layer in the hydroprocessing reactor. The guard bed or the guard bed units can retain both solid and solvated impurities of the feed of biological origin, such as silicon based anti-foaming agents of a tall oil process and harmful chemical elements. The guard bed and/or the guard bed units can be heated, unheated, pressurized or unpressurised, fed with hydrogen gas or without hydrogen gas. Preferably the guard bed and/or the guard bed units are heated and unpressurised.

There are basically two types of guard beds, i.e. active and inactive guard beds. The active guard beds may contain metals from group VI, VII and/or VIII and they take part in the purification of the feed and they can be placed either in separate guard bed units or inside the hydroprocessing reactor itself. The inactive guard beds merely heat the feed and when they are contained in the hydroprocessing reactor they distribute the feed more evenly across the cross-section area of the reactor. These guard beds comprise suitable passive or inert materials.

In order to function and stay active the dewaxing catalyst needs organic sulphur. Therefore when the feed of biological origin does not in itself contain sulphur or its sulphur concentration is too low, additional sulphur is fed to the step of hydroprocessing. The additional sulphur can be fed to the hydroprocessing step together with the feed of biological origin or it can be fed separately to the hydroprocessing step. Additional sulphur can be supplied to the process in gaseous form like hydrogen sulphide, or it can be any material that produces hydrogen sulphide in the process, like organic sulphur compounds, such as dimethyl disulphide. In an embodiment of the invention, additional sulphur is provided by recirculating the $H_2S$-containing gas retrieved from the hydroprocessing reactor. The amount of additional sulphur depends on the amount of sulphur contained in the feed. Generally, the $H_2$ feed/$H_2S$ ratio must be maintained over about 0.0001, preferably over about 0.001.

According to one embodiment of the present invention a desired portion of the mixture of fuel components can be recycled back to the feed of biological origin and/or to the step of hydroprocessing. The cracking process of selected hydrocarbons, i.e. C17-C18 hydrocarbons can be advanced further by recycling them back to the feed of the hydroprocessing step. The fraction of hydrocarbons to be recycled can be selected to be the product of the hydroprocessing reactor or a desired fraction separated from it, such as fraction comprising >C17 hydrocarbons. The momentary proportion of recycled hydrocarbons to fresh feed can vary from 0 to 100%, preferably from 0 to 70%. Recycling is also a preferable way of controlling the exothermic balance of the reaction. The purpose of the recycling is to control the exothermic heat production on the catalyst system. Excess heating destroys the catalyst and affects negatively to the product selectivity, i.e. the cracking is increased. If the temperature is too high, the active metals of the catalyst can agglomerate, and this leads to the decrease in the activity of the catalyst. Heavy cracking, which also takes place, produces elemental carbon, which blocks the sites of the catalyst and the activity is vanished and in the end the reactor is clogged. The exothermic heat production on the catalyst system can also be controlled by diluting the dewaxing catalyst with silicon carbide, aluminium oxide, glass beads, less active catalyst and/or inert ingredients.

The process of the present invention is carried out in a single step of hydroprocessing in the presence of a catalyst system comprising dewaxing catalyst. By adjusting the process temperature to a desired level the cracking properties of the catalyst are adjusted so that C15 to C18 paraffin products are not cracked too much. When the feed contains compounds with sterol structures, long alkyl chains of the sterol structures, even sterol alkyl chains containing 11 carbon atoms, are cracked off the ring structures and C17 to C20 paraffins containing fused ring structures and sterol alkyl chains are obtained. This can be controlled by adjusting the process temperature and/or by diluting the catalyst and/or by any other suitable ways known in the process technology.

The step of hydroprocessing is carried out at a temperature range from about 280° C. to about 500° C., preferably from about 330° C. to about 430° C. The opening of the fused ring structures is also a desired property of the catalyst.

The step of hydroprocessing is carried out at a pressure of about 30 to about 200 bar, preferably at a pressure of about 70 to about 100 bar, most preferably at about 50 to about 90 bar.

The feed is pumped to the hydroprocessing reactor at a desired speed. Feed rate WHSV (weight hourly spatial velocity) of the feed material is proportional to an amount of the catalyst: WHSV is calculated according to the following equation:

$$WHSV[h^{-1}] = \frac{V_{feed[g/h]}}{m_{catalyst[g]}}$$

wherein $V_{feed[g/h]}$ means a pumping velocity of the feed material, and $m_{catalyst[g]}$ means an amount of the dewaxing catalyst.

WHSV of the feed material is typically in the range of about 0.4 to about 3, more typically from 0.5 to 1.25 and preferably from 0.7 to 0.9.

The amount of hydrogen gas needed to hydrogenate the olefinic bonds of the unsaturated compounds in the feed is determined by the amount of the feed. A suitable amount of hydrogen can be determined by a person having ordinary skills in the art. Typically, the relation $H_2$ feed/feed is in the range of from about 100 to about 1 250 Nl/l, preferably from about 500 to about 800 Nl/l. (Nl=normal liter).

The process according to the present invention may further comprise a hydropolishing step for treating the obtained mixture of fuel components. A hydropolishing catalyst can be any suitable catalyst containing metals from group VI, VII and/or VIII. If sulphur is removed before hydropolishing, catalysts such as Pd—Pt/$Al_2O_3$ or Pt—Pd/zeolite may be used in the hydropolishing step. In case the mixture of fuel components contain sulphur, catalysts containing Ni, Co, Mo, W or mixtures thereof, may be used. According to an embodiment of the present invention the obtained mixture of fuel components is fed to hydropolishing step where double bonds of the components are removed and decolouring takes place.

The hydropolishing step can be carried out in any kind of reactor, column, vessel, container, tube or pipe, which is suitable for hydropolishing.

The hydropolishing is a light hydrating process, which aims at decolouring of the product, removal of any possible olefinic residues, stabilising of the product and thus improving the storability of the product.

In the hydropolishing step of the present invention any of the remaining unsaturated carbon double bonds are saturated and the UV stability and the colour of the product are improved.

In the hydropolishing step according to the present invention the total pressure in the hydropolishing step is from about 100 to about 300 bar. The temperature in the hydropolishing step is in the range from about 200 to about 370° C. The LHSV is in the range of from 0.2 to 2.0. Hydrogen is supplied to the hydropolishing step at the rate in which $H_2$/feed ratio is in the range from about 0.5 to about 1.7 $m^3$/l.

The hydropolishing unit may be integrated into the same gas system as the hydroprocessing unit. In this configuration, the fresh hydrogen is fed first to the hydropolishing unit.

The process according to the present invention may further comprise a pre-treatment step prior to the hydroprocessing step. The pre-treatment step can include one or several of the following procedures: distillation, filtration and purification of the feed. The purification can be done by standard methods employed in oil processing. Also methods such as adsorption on a suitable material, ion exchange or acidic washing can be used to remove alkali metals and earth alkali metals (Na, K, Ca) in the feed. Also degumming, i.e. washing the feed with $H_3PO_4$, NaOH and soft water can be used to remove the metals in the feed. If the feed contains tall oil, depitching the crude tall oil can be used to remove unsaponifiables and ash in the tall oil. All these purification methods are well known in the art and are not discussed here in further detail.

The process of the invention produces hydrocarbon product streams having distillation curves conforming to those of standardized diesel, gasoline, naphtha and jet fuels. As a general, hydrocarbons distilling at a temperate range from 180 to 370° C. are obtained as a middle distillate conforming to diesel fuel quality standard EN 590. Hydrocarbons distilling at temperatures ranging from 150° C. to 210° C. are useful as high quality gasoline fuel. They conform to the standard EN228. Hydrocarbons having a distillation temperature above 370° C. are useful as aviation applications, generally referred to as naphtha. Hydrocarbons having a distillation temperature between 160° C. and 300° C. are generally referred to as jet fuel. The jet fuel conforms to standard ASTM D-1655. The composition of the products obtained with the method of the present invention depends on the feed material used as well as on the operation conditions of the process used. The products obtained can be used as fuel as such or they can be used as fuel components and be blended with other fuels or fuel components. Preferably the obtained product is used as diesel fuel. When the products of the present invention are blended as fuel components the properties of the final blends conform to those of the desired standards, especially to EN590, EN228 and ASTM D-1655.

Any component of the obtained mixture of the fuel components can be isolated from the mixture by various separation process alternatives. For example the components can be isolated by distillation, vacuum distillation, flash separation, evaporation, chromatographic separation or any other suitable separation process known to a person skilled in the art.

It has now also surprisingly been found out that rendered slaughter tallow, which has a titer over 40° C., can be processed selectively and with good yield to fluid fuel components. It has further surprisingly been found out that, as presented also in connection with other feed materials, with the help of hydrogen pressure (hydrogen/hydrocarbon ratio) the cracking and isomerisation of the desired product can be controlled efficiently. The tallow does not contain sulphur and when rendered tallow is used as a feed to the process of the present invention hydropolishing step is not necessarily needed.

The experiments conducted have shown that when rendered tallow is fed to a process unit containing commercially available dewaxing catalyst (HW) under suitable reaction conditions, it was found out that heavy isomerisation takes place but only a modest amount of cracking is occurring. This is believed to be caused by the protein residue contained in the rendered tallow. Namely, when the protein residue reacts with the dewaxing catalyst, it releases ammonia. It is believed that ammonia is reacting as an alkali and neutralises the strongest acid sites of $NiW/Al_2O_3$ catalyst, which are also the most active sites for cracking hydrocarbons. By controlling the amount of nitrogen in the catalyst system it is possible to control the activity of the catalyst.

It was also found out that the cracking/isomerizing is strongly dependent on the pressure used. For example, by adjusting the hydrogen pressure to a desired level, a product, which has desired cold properties, is obtained. At the same time the yield is optimized to be the best possible.

The present invention relates to a use of fuel components produced by the process according to the present invention as a fuel or as an additive in a fuel composition. Examples of the compositions are diesel range fuel, gasoline range fuel, naphtha range fuel and/or jet fuel. According to a preferred embodiment of the present invention the fuel is a diesel fuel. Important fuel properties for potential diesel applications include for example cetane number, viscosity, lower heating value, flash point, cloud point, Distillation Curve, carbon residue, ash and Iodine Value. In a modern diesel engine the diesel fuel is part of the engine lubrication process and therefore it is an important property. Cetane number rates the ignition quality of diesel fuels. Viscosity measures the fluids resistance to flow. Lower heating value is a measure of availability energy in the fuel. Flash point of a volatile liquid is the lowest temperature at which it can vaporize to form an ignitable mixture in air. Cloud point of a fluid is the temperature at which dissolved solids are no longer completely soluble, precipitating as a second phase giving the fluid a cloudy appearance. Distillation Curve is characterized by the initial temperature at which the first drop of liquid exits the condenser and subsequent temperatures at each 10 volume-% of the liquid. Carbon residue of a fuel is the tendency to form carbon deposits under high temperature conditions in an inert atmosphere. Ash is the name given to all non-aqueous residue, which remains after a sample is burned. Iodine Value measures the number of double bonds.

Figure 1:
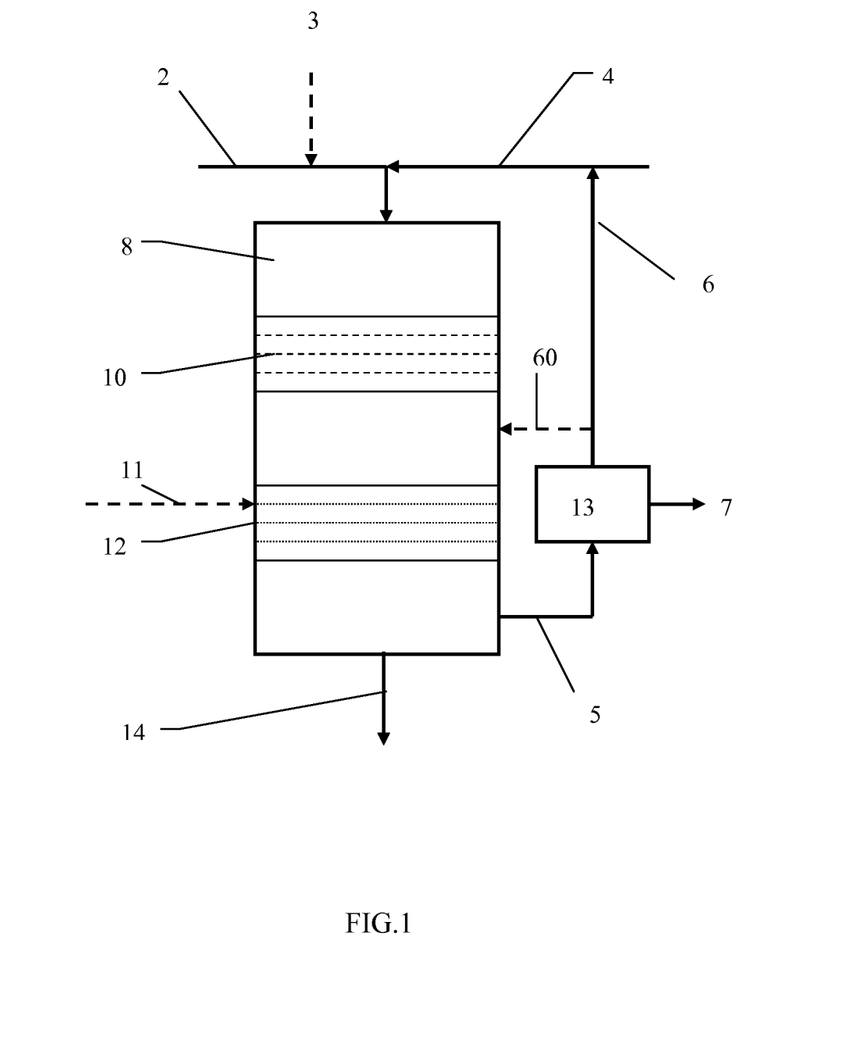
FIG. 1 shows an embodiment of an apparatus of the invention for carrying out a single-step process for producing fuel components from the feed of biological origin.

The present invention relates also to an apparatus for producing a mixture of fuel components. FIG. 1 shows an apparatus for producing a mixture of fuel components wherein the apparatus comprises a first feed inlet 2 for feeding the feed of biological origin, at least one first hydrogen feed inlet 4 and at least one hydroprocessing reactor 8 comprising dewaxing catalyst bed 12 for producing a mixture of the fuel components.

Referring to FIG. 1, the feed of biological origin is fed through the first feed inlet 2 to a hydroprocessing reactor 8. Hydrogen is fed to the first feed inlet 2 of the hydroprocessing reactor 8 through a first hydrogen feed inlet 4. The hydroprocessing reactor 8 comprises a guard bed 10 and dewaxing catalyst bed 12 for producing a mixture of the fuel components. Product containing a mixture of fuel components is recovered through first hydroprocessing product outlet 14.

The offgases exiting from the hydroprocessing reactor 8 are discharged from the hydroprocessing reactor 8 through a first separation unit inlet 5. The gases contain unreacted hydrogen, hydrogen sulphide that is formed in the hydroprocessing reactor 8 during the process and other gases and impurities. Hydrogen sulphide and other impurities must be removed from the off-gases to some extent, otherwise it is concentrated to the process. Naturally, this is dependent on the amount of sulphur in the feed.

The apparatus of FIG. 1 also includes a first separation unit 13 for separating excess hydrogen sulphide and other harmful gases, such as ammonia from the other gaseous components, such as hydrogen, discharged from the hydroprocessing reactor 8.

The gases are treated in the separation unit 13 and the hydrogen and a desired part of the hydrogen sulphide are recycled back to the first hydrogen feed inlet 4 of the hydroprocessing reactor 8 through first hydrogen outlet 6.

Hydrogen can be separated in the first separation unit 13 by any means known in the art, such as membrane separation or amine washing. Hydrogen sulphide is led out of the first separation unit 13 through a first hydrogen sulphide outlet 7. Separated hydrogen is recycled back to first hydrogen feed inlet 4 through first hydrogen outlet 6 and/or straight to the hydroprocessing reactor 8 through first hydrogen recycle inlet 60.

In order to keep the catalyst active, additional sulphur has to be supplied to the reactor. This can be done by feeding additional sulphur to the hydroprocessing reactor 8 and/or recycling a part of the hydrogen sulphide formed in the hydroprocessing reactor 8 back to the reactor. Optionally, in the embodiment shown in FIG. 1, additional sulphur is supplied to the process via a first sulphur feed inlet 3 (shown in dotted lines in FIG. 1). The additional sulphur can be in gaseous form like hydrogen sulphide, or it can be any material producing hydrogen sulphide in the process, for example organic sulphur compounds, such as dimethyl disulphide. In an embodiment of the invention, additional sulphur is provided by recirculating the $H_2S$-containing gas retrieved from the hydroprocessing reactor 8.

Optionally, a second additional sulphur feed inlet 11 (shown in dotted line in FIG. 1) is arranged to the hydroprocessing reactor 8 for supplying additional sulphur to the hydroprocessing reactor 8.

Figure 2:
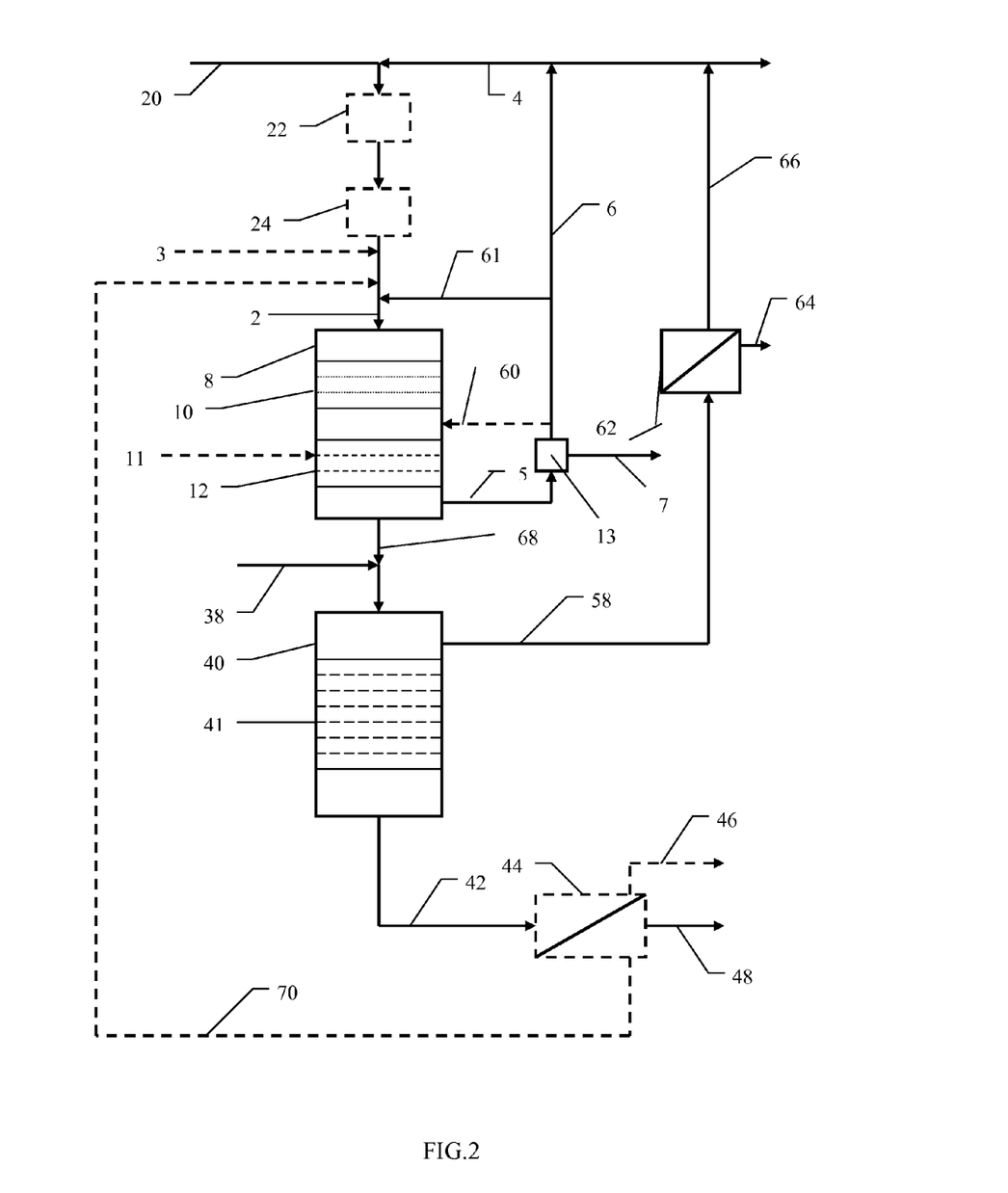
FIG. 2 shows an embodiment of an apparatus of the invention for carrying out a single-step process for producing fuel components from the feed of biological origin and further subjecting the obtained product to hydropolishing.

FIG. 2 shows an apparatus for producing a mixture of fuel components, wherein the apparatus comprises in addition to what is shown in FIG. 1 also a hydropolishing reactor 40 and optionally two guard bed units 22, 24. Units 22 and 24 are shown in dotted lines meaning that they are optional.

Referring to FIG. 2 the feed of biological origin is fed to the first guard bed unit 22 through a second feed inlet 20.

Hydrogen is fed to the second feed inlet 20 through a first hydrogen feed inlet 4. The formed mixture is led though a first guard bed unit 22 and a second guard bed unit 24 and the purified/heated feed of biological origin is fed to the hydroprocessing reactor 8 though a first feed inlet 2. The hydroprocessing reactor 8 comprises a guard bed 10 and a dewaxing catalyst bed 12.

As described in connection with reference to FIG. 1, hydrogen sulphide is formed in the hydroprocessing reactor 8 during the process.

The apparatus of FIG. 2 also includes a first separation unit 13 for separating excess hydrogen sulphide and other harmful gases, such as ammonia from the other gaseous components discharged from the hydroprocessing reactor 8.

The gases are here too treated in the first separation unit 13 and the hydrogen and a desired part of the hydrogen sulphide are recycled back to the first hydrogen feed inlet 4 of the hydroprocessing reactor 8 through first hydrogen outlet 6.

Hydrogen can be separated by any means known in the art, such as membrane separation or amine washing. Hydrogen sulphide is led out of the first separation unit 13 through a first hydrogen sulphide outlet 7. Separated hydrogen is recycled back to first hydrogen feed inlet 4 through first hydrogen outlet 6 and/or straight to the hydroprocessing reactor 8 through first hydrogen recycle inlet 60 and/or back to the first feed inlet 2 through the second hydrogen recycle inlet 61.

Optionally, a first additional sulphur feed 3 (shown in dotted lines in FIG. 2 meaning it is optional) can be supplied to the process if the feed does not contain sulphur enough to keep the catalyst active. Sulphur feed can be in gaseous form like hydrogen sulphide, or it can be any material producing hydrogen sulphide in the process, for example organic sulphur compounds, such as dimethyl disulphide. In an embodiment of the invention, sulphur feed is provided by recirculating the $H_2S$-containing gas retrieved from the hydroprocessing reactor 8.

Optionally, a second sulphur feed inlet 11 is arranged to the hydroprocessing reactor 8 for supplying additional sulphur to the hydroprocessing reactor 8. This is also shown in dotted lines meaning it is optional.

From the hydroprocessing reactor 8 the hydroprocessing product containing a mixture of fuel components is fed to a hydropolishing reactor 40 through a first connection inlet 68 which interconnects with a third hydrogen feed inlet 38. The hydropolishing reactor 40 comprises a hydropolishing catalyst bed 41. The unreacted hydrogen and other gaseous components from the hydropolishing reactor 40 are removed through a second hydrogen outlet 58 and recycled back to first hydrogen feed inlet 4 via a second separation unit 62 where off-gases are separated and removed through first separation unit outlet 64. Hydrogen is fed from the second separation unit 62 through a second hydrogen separation outlet 66 to first hydrogen feed inlet 4.

From hydropolishing reactor 40 the obtained hydropolished product is fed through hydropolishing product outlet 42 to an optional third separation unit 44. The third separation unit is preferably a distillation unit. From the third separation unit 44 light hydrocarbon fractions are recovered through a third separation unit outlet 46, middle distillate product is recovered through fourth separation unit outlet 48 and if desired, a selected fraction comprising heavier hydrocarbons, i.e. hydrocarbons having a carbon number over C18 is recycled back to the first feed inlet 2 of the apparatus through first product recycle outlet 70. These are shown in dotted line meaning they are optional. Optionally, also the middle distillate fraction, liquid obtained from hydropolishing product outlet 42 or from a first connection inlet 68 can be recycled back to the process.

Depending on the properties of the product obtained from hydropolishing and recovered through the hydropolishing outlet 42, the third separation unit 44 is optional. For example, when the feed to the process is tallow, the third separation unit 44 is not needed. If light fractions are desired to be separated the third separation unit can be a simple separation unit, such as a flash unit. If the product obtained from hydroprocessing contains heavy fractions the third separation unit 44 is a distillation unit and the heavy fractions are recycled back to the feed of the hydroprocessing reactor. The sulphur contained in the product can be separated by a flash separation before the third separation unit 44.

Figure 3:
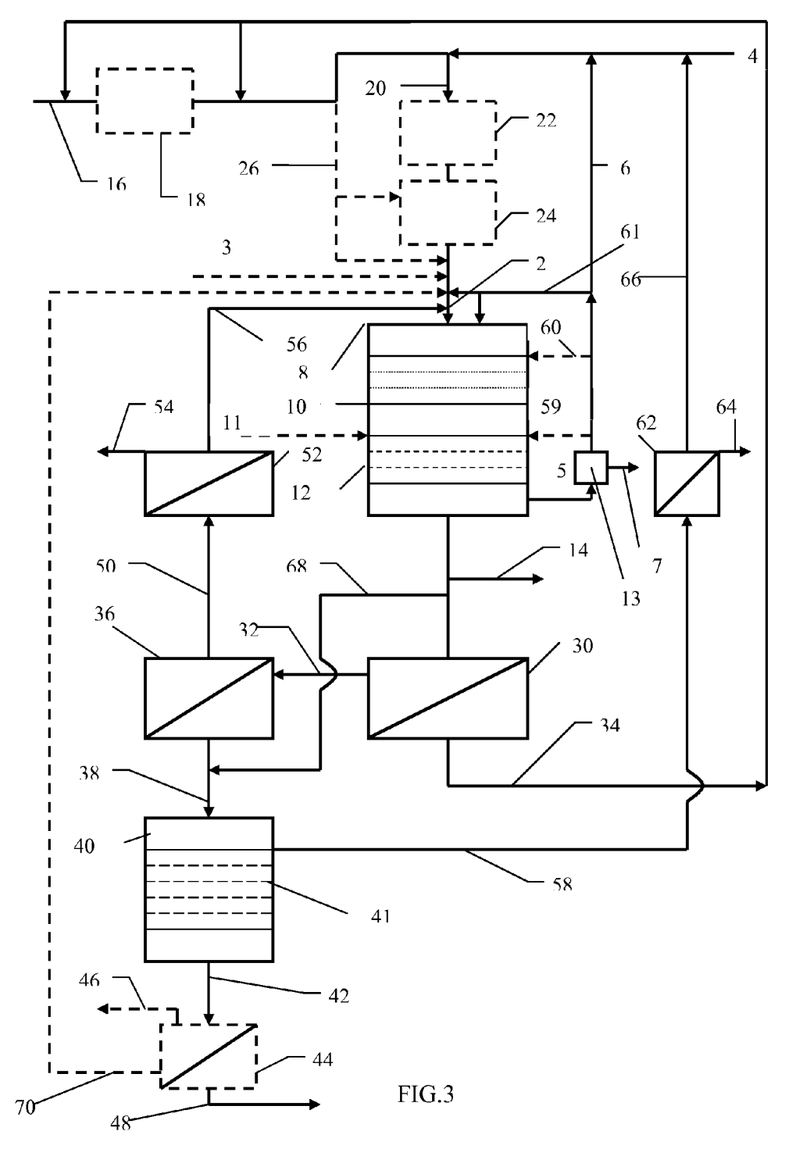
FIG. 3 shows an embodiment of an apparatus of the invention for carrying out a single-step process for producing fuel components from the feed of biological origin further subjecting the obtained product to hydropolishing and further to distillation and flash separation steps.

FIG. 3 shows an apparatus for producing a mixture of fuel components, wherein the apparatus comprises in addition to what is shown in FIG. 1 and FIG. 2 also an optional pre-treatment unit 18, a fourth separation unit 30, a fifth separation unit 36, a sixth separation unit 52 and inlets and outlets related to them.

Referring to FIG. 3, optionally the feed of biological origin is fed to a pre-treatment unit 18 through pre-treatment inlet 16. The pre-treatment unit is drawn in dashed line meaning that it can be optional in the construction of the apparatus according to FIG. 3. The feed from the pre-treatment unit 18 is fed to an optional first guard bed unit 22 through a second feed inlet 20. Hydrogen is fed to the second feed inlet 20 through first hydrogen feed inlet 4. The formed mixture is led though a second guard bed unit 24 and fed to the hydroprocessing reactor 8 though a first feed inlet 2. The hydroprocessing reactor 8 comprises a guard bed 10 and dewaxing catalyst bed 12.

Hydrogen sulphide is formed in the hydroprocessing reactor 8 during the process. Hydrogen sulphide and other impurities must be removed from the offgases to some extent, otherwise it is concentrated to the process. Naturally this is dependent on the amount of sulphur in the feed.

The apparatus of FIG. 3 also includes a first separation unit 13 for separating excess hydrogen sulphide and other harmful gases, such as ammonia from the other gaseous components discharged from the hydroprocessing reactor 8. Hydrogen sulphide is removed from the hydroprocessing reactor 8 together with other offgases comprising hydrogen and other unreacted gases through first separation unit inlet 5.

The gases are treated in the first separation unit 13 and the hydrogen and a desired part of the hydrogen sulphide is recycled back to the first hydrogen feed inlet 4 of the hydroprocessing reactor 8 through first hydrogen outlet 6.

Hydrogen can be separated by any means known in the art, such as membrane separation or amine washing. Hydrogen sulphide is led out of the first separation unit 13 through a first hydrogen sulphide outlet 7. Separated hydrogen is recycled back to first hydrogen feed inlet 4 through first hydrogen outlet 6 and/or straight to the guard bed 10 in the hydroprocessing reactor 8 through first hydrogen recycle inlet 60 and/or straight back to the dewaxing catalyst bed 12 in the hydroprocessing reactor 8 through a third hydrogen recycle inlet 59 and/or back to the first feed inlet 2 through a second hydrogen recycle inlet 61.

A first additional sulphur feed 3 (shown in dotted lines in FIG. 3 meaning it is optional) can be supplied to the process if the feed does not contain sulphur enough to keep the catalyst active. Additional sulphur feed can be in gaseous form like hydrogen sulphide, or it can be any material producing hydrogen sulphide in the process, for example organic sulphur compounds, such as dimethyl disulphide. In an embodiment of the invention, sulphur feed is provided by recirculating the $H_2S$-containing gas retrieved from the hydroprocessing reactor 8.

A second additional sulphur feed inlet 11 is arranged to the hydroprocessing reactor 8 for supplying additional sulphur to the hydroprocessing reactor 8. This is also shown in dotted lines meaning it is optional.

The feed of biological origin can also be fed straight to the second guard bed unit 24 or straight to the hydroprocessing reactor 8 through a bypass route 26. The by-pass route 26 is presented on dashed-line, meaning that it is an optional alternative in the apparatus of FIG. 3.

Product from the hydroprocessing reactor 8 is recovered through first hydroprocessing product outlet 14 and/or fed to the hydropolishing reactor 40 through a first connection inlet 68 which interconnects with a third hydrogen feed inlet 38. As can be realized it is thus possible to recover only part of the product and at the same time supply a part of the product to hydropolishing.

Another option is to supply the product from the hydroprocessing reactor 8 to a fourth separation unit 30 wherein the product is separated, preferably by distillation and the obtained heavy hydrocarbon fraction is recycled back to pre-treatment inlet 16 and/or the second feed inlet 20 through fifth separation unit outlet 34. The light hydrocarbon fraction obtained is fed to a fifth separation unit 36 through sixth separation unit outlet 32.

In the fifth separation unit 36 gaseous components are separated from the sixth separation unit outlet 32 feed and the gaseous fraction obtained is fed to the hydropolishing reactor 40 through a hydropolishing hydrogen feed inlet 38. Gases separated in the fifth separation unit 36 are fed through separation unit gas outlet 50 to a sixth separation unit 52, from which separated off-gas is led out via second off-gas outlet 54 and the hydrogen and hydrogen sulphide is fed to inlet 2 via third hydrogen outlet 56.

The hydropolishing reactor 40 comprises a hydropolishing catalyst bed 41. The unreacted hydrogen and other gaseous components, such as hydrogen sulphide, in the hydropolishing reactor 40 are removed through second hydrogen outlet 58 and recycled back to first hydrogen feed inlet 4 via a second separation unit 62 wherein off-gas is separated and removed through first separation unit outlet 64. Hydrogen is fed from the second separation unit 62 through second hydrogen separation outlet 66 to first hydrogen feed inlet 4.

From hydropolishing reactor 40 the obtained hydropolished product is fed through hydropolishing product outlet 42 to an optional third separation unit 44. From the third separation unit 44 light fraction is recovered and led out through the third separation unit outlet 46, middle distillate product, i.e. diesel product is recovered and led out through fourth separation unit outlet 48 and heavier than C18 fraction is recycled back to the first feed inlet 2 of the apparatus through first product recycle outlet 70. Again here the need for the third separation unit 44 depends on the properties of the product obtained from hydropolishing and recovered through the hydropolishing outlet 42, as already presented above in connection with reference to FIG. 2.

A reactor in this application can be any kind of suitable reactor, vessel, container, column, pipe or tube.

A separation unit in this application can be ordinary distillation column, hydrogen selective membrane or flash distillation column.

An inlet in this application can be any kind of suitable means for letting in a feed, for example pipe, tube, hose or connecting device suitable for this purpose.

An outlet in this application can be any kind of suitable means for letting out, for example pipe, tube, hose or connecting device suitable for this purpose.

A catalyst system in this application comprises a catalyst bed.

The catalyst system can comprise one or more guard beds. The one or more guard beds can be arranged either to separate guard bed units and/or in the hydroprocessing reactor.

The purpose of the guard bed is to act as a purifying bed and also as a distributing layer in the hydroprocessing reactor. The guard bed or the guard bed units can retain both solid and solvated impurities of the feed of biological origin, such as silicon based anti-foam agents of a tall oil process and harmful chemical elements. The guard bed and/or the guard bed units can be heated, unheated, pressurized or unpressurized, fed with hydrogen gas or without hydrogen gas. Preferably the guard bed and/or the guard bed units are heated and unpressurised.

There are basically two types of guard beds, i.e. active and inactive guard beds. The active guard beds take part in the purification of the feed and they can be placed either in separate guard bed units or inside the hydroprocessing reactor it self. The catalyst material of an active guard bed is typically activated gamma aluminium oxide or some commercially available purifying catalyst. The inactive guard beds merely heat the feed and when they are arranged in the hydroprocessing reactor they distribute the feed more evenly across the cross-section area of the reactor. These guard beds comprise suitable passive or inert materials, such as glass beads.

It is also possible that the catalyst system comprises two or more guard bed units. These guard bed units can be operated sequentially, i.e. when the other guard bed is in use, the other is at the same time regenerated for further use. There are basically two types of guard beds, i.e. active and inactive guard beds. The active guard beds take part in the purification of the feed and they can be placed either in separate guard bed units or inside the hydroprocessing reactor itself. The inactive guard beds merely heat the feed and when they are contained in the hydroprocessing reactor they distribute the feed more evenly across the cross-section area of the reactor. These guard beds comprise suitable passive or inert materials.

The dewaxing catalyst contained in the hydroprocessing reactor is any catalyst which is capable of converting biological feed material to fuel components in a single step. Preferably the dewaxing catalyst is NiW on a support selected from $Al_2O_3$, zeolite, zeolite-$Al_2O_3$, and $Al_2O_3$—$SiO_2$. Preferably the dewaxing catalyst is NiW on an $Al_2O_3$ support.

The catalyst contained in the hydropolishing reactor is any hydropolishing catalyst, such as Pd—Pt/$Al_2O_3$, Pt—Pd/zeolite or Ni-based catalyst containing Co, W, Mo or mixtures thereof for example NiMo, CoMo, NiW.

It will be obvious to a person skilled in the art that, as the technology advances, the inventive concept can be implemented in various ways. The invention and its embodiments are not limited to the examples described above but may vary within the scope of the claims.

The following examples are presented for further illustration of the invention without limiting the invention thereto.

EXAMPLES

Example 1

Two samples of different biological origin were processed according to the invention. Table 1 presents the process parameters of Samples 1 and 2. Sample 1, consisted of crude tall oil, i.e. CTO and Sample 2 consisted of animal fat, i.e. tallow.

TABLE 1

| Feed | CTO (Sample 1) | Tallow (Sample 2) |
|---|---|---|
| Sulphur content (%) | About 1 | About 1 |
| Catalyst | NiW/$Al_2O_3$ | NiW/$Al_2O_3$ |

TABLE 1-continued

| Feed | CTO (Sample 1) | Tallow (Sample 2) |
|---|---|---|
| Reaction pressure (bar) | 90 | 90 |
| WHSV ($h^{-1}$) | 0.75-0.8 | 0.75-0.8 |
| Temperature of bed (° C.) | 410 | 410 |
| $H_2$ feed/feed (Nl/l) | 735 | 735 |

In the catalyst bed, a temperature gradient was arranged by dividing the bed in three consecutive sections in the flow direction of the feed. The temperature in the first section was 410° C., in the second section 380° C. and in the third section 365° C. This was done to prevent product from excess cracking.

The compositions of the product obtained were measured for the two samples. The results from the two analyses are summarized in Table 2.

TABLE 2

| | Method | Product 1 from Sample 1 (CTO) | Product 2 from Sample 2 (tallow) |
|---|---|---|---|
| Cetane number | EN ISO 4264 | 59.3 | n.a. |
| Cetane index | EN ISO 3405 | 61.2 | 88.4 |
| Distillation: | | | |
| Initial boiling point (° C.) | | 100.9 | 110.0 |
| Recovered at 180 (% (v/v)) | | 12.5 | 6.6 |
| Recovered at 250 (% (v/v)) | | 30.5 | 25.1 |
| Recovered at 340 (% (v/v)) | | 92 | 98.4 |
| Recovered at 350 (% (v/v)) | | 93 | 98.4 |
| Final boiling point (° C.) | | 381.7 | 311.9 |
| Recovery (% (v/v)) | | 97 | 98.4 |
| Viscosity ($mm^2$/s) | EN ISO 3104 | 2.431 | 2.247 |
| Cloud point (° C.) | EN 23015 | −6 | −6 |
| Carbon residue (% m/m), on 10% distillation residue | EN ISO 10370 | 0.05 | 0.01 | n.a.: not analyzed

Example 2

The product 2 obtained from Sample 2 (tallow) was blended with a standard diesel fuel in various mixing ratios. The mixing ratios were as follows:

Sample 2: Product 2 of Example 1
Sample 3: Diesel (CP 0/CFPP-5) blended with 0% of Product number 2 of Example 1
Sample 4: Diesel (CP 0/CFPP-5) blended with 5% of Product number 2 of Example 1
Sample 5: Diesel (CP 0/CFPP-5) blended with 10% of Product number 2 of Example 1
Sample 6: Diesel (CP 0/CFPP-5) blended with 15% of Product number 2 of Example 1

CP means here Cloud Point and CFPP means Cold Filter Plugging Point.

TABLE 3

| | Method | Sample 2 | Sample 3 | Sample 4 | Sample 5 | Sample 6 |
|---|---|---|---|---|---|---|
| Flash Point (° C.) | SFS-EN ISO 2719 | 26.5 | 63.5 | 62.5 | 61.5 | 60.5 |
| Cloud Point (° C.) | ISO 3015:1992 | −6.0 | 0.0 | −1.0 | −1.0 | −2.0 |
| Cold filter plugging point (° C.) | SFS-EN 116 | −10.0 | −5.0 | −8.0 | −8.0 | −9.0 |

As can be realized from the results of Table 2 and 3 the cetane index of the products 1 and 2 is extremely good. The products are suitable for blending components and the products improve significantly the cold properties when blended to summer grade diesel (0/−5).

The invention claimed is:

1. A process for producing a mixture of fuel components, wherein the process comprises
providing a feed of biological origin selected from tall oil, crude tall oil, resins and resin acids obtained from plants, and bio-oil from hydropyrolyzed wood;
subjecting said feed of biological origin and a hydrogen gas feed to a single step of hydroprocessing in the presence of a catalyst system comprising a NiW catalyst supported on zeolite-$Al_2O_3$, wherein the volume ratio of hydrogen gas feed to feed of biological origin is 100:1 to 1250:1 normal liter/liter, to form a mixture of fuel components,
said NiW catalyst supported on zeolite-$Al_2O_3$ effecting the hydroprocessing by hydrodeoxygenating, hydrodesulfurizing, isomerizing, ring opening and cracking the feed of biological origin, and
separating from the mixture of fuel components a fraction comprising C17 and higher hydrocarbons and recycling the fraction back to the feed of biological origin and/or to the step of hydroprocessing.

2. The process according to claim 1, wherein the catalyst is diluted with an agent selected from silicon carbide, aluminium oxide, glass beads, less active similar catalyst and inert ingredients.

3. The process according to claim 1 wherein the catalyst system optionally comprises at least one guard bed.

4. The process according to claim 1 wherein an additional sulphur feed is fed to the step of hydroprocessing.

5. The process according to claim 1 wherein hydrogen is recovered and recycled back to the step of hydroprocessing.

6. The process according to claim 1 wherein the step of hydroprocessing is carried out at a temperature range from about 280° C. to about 500° C.

7. The process according to claim 1 wherein the step of hydroprocessing is carried out at a pressure of about 30 to about 200 bar.

8. The process according to claim 1 wherein the WHSV of the feed material is in the range of about 0.4 to about 3.

9. The process according to claim 1 wherein any component can be isolated from the mixture of fuel components obtained.

10. The process according to claim 1, wherein the process further comprises a hydropolishing step for treating the obtained mixture of fuel components.

11. A process for producing mixture of fuel components, characterized in that the process comprises
providing a feed of biological origin;
subjecting said feed of biological origin and a hydrogen gas feed to a single step of hydroprocessing in the presence of a catalyst system comprising NiW catalyst supported on zeolite-$Al_2O_3$ to form a mixture of fuel components,
said NiW catalyst supported on zeolite-$Al_2O_3$ effecting the hydroprocessing by hydrodeoxygenating, hydrodesulfurizing, isomerizing, ring opening and cracking said feed of biological origin, and
separating from the mixture of fuel components a fraction comprising C17 and higher hydrocarbons and recycling the fraction back to the feed of biological origin and/or to the step of hydroprocessing.

12. The process according to claim 11, characterized in that the feed of biological origin is selected from the group consisting of
i) any kind of fats, any kind of waxes, plant fats, plant oils, plant waxes; animal fats, animal oils, animal waxes, fish fats, fish oils, fish waxes, and
ii) fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis, and
iii) esters obtained from plant fats, plant oils, plant waxes; animal fats, animal oils, animal waxes; fish fats, fish oils, fish waxes, and mixtures thereof by transesterification, and
iv)) metal salts of fatty acids obtained from plant fats, plant oils, plant waxes; animal fats, animal oils, animal waxes; fish fats, fish oils, fish waxes, and mixtures thereof by saponification, and
v) anhydrides of fatty acids from plant fats, plant oils, plant waxes; animal fats, animal oils, animal waxes; fish fats, fish oils, fish waxes, and mixtures thereof, and
vi) esters obtained by esterification of free fatty acids of plant, animal and fish origin with alcohols, and
vii) fatty alcohols or aldehydes obtained as reduction products of fatty acids from plant fats, plant oils, plant waxes; animal fats, animal oils, animal waxes; fish fats, fish oils, fish waxes, and mixtures thereof, and
viii) recycled food grade fats and oils, and fats, oils and waxes obtained by genetic engineering,
ix) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds,
x) compounds derived from algae,
xi) terpene-based compounds obtained from plants, terpene oils, distillation bottoms from terpene distillation and flavorants and/or fragrance industry,
xii) resins, resin acids or sterols obtained from plants, bio-oil from hydropyrolyzed wood, Fischer-Tropsch wax, and
xiii) mixtures of said feeds of biological origin.

13. The process according to claim 11, characterized in that the feed of biological origin is selected form the group consisting of fish oils such as Baltic herring oil, salmon oil, herring oil, tuna oil, anchovy oil, sardine oil, and mackerel oil; plant oils such as rapeseed oil, colza oil, canola oil, tall oil, crude tall oil, sunflower seed oil, soybean oil, corn oil, hemp oil, linen seed oil, olive oil, cottonseed oil, mustard oil, palm oil, peanut oil, castor oil, Jatropha seed oil, Pongamia pinnata seed oil, palm kernel oil, and coconut oil; and animal fats such as lard, tallow, rendered lard and rendered tallow and waste and recycled food grade fats and oils, as well as fats, waxes and oils produced by genetic engineering; animal waxes such as bee wax, Chinese wax (insect wax), shellac wax, and lanoline (wool wax); plant waxes such as carnauba palm wax, Ouricouri palm wax, jojoba seed oil, candelilla wax, esparto wax, Japan wax, rice bran oil, terpenes, terpineols, triglycerides and mixtures thereof.

* * * * *